United States Patent [19]
Alderman et al.

[11] Patent Number: 6,018,159
[45] Date of Patent: Jan. 25, 2000

[54] DIFFERENTIAL CLEAR CONTAINER SENSOR WITH IMPROVED NOISE IMMUNITY

[75] Inventors: Richard A. Alderman; David A. Klein; Bo Su Chen, all of Freeport, Ill.

[73] Assignee: Honeywell Inc., Minneapolis, Minn.

[21] Appl. No.: 08/987,818

[22] Filed: Dec. 10, 1997

[51] Int. Cl.[7] .................................................. G01N 9/04
[52] U.S. Cl. .................... 250/223 B; 356/239.1; 209/524
[58] Field of Search ................ 250/223 B; 209/524, 209/526; 356/239.1, 239.4, 239.7

[56] References Cited

U.S. PATENT DOCUMENTS

| | | | |
|---|---|---|---|
| 3,792,930 | 2/1974 | Obenreder | 356/239.1 |
| 5,072,108 | 12/1991 | Ishikawa | 250/223 B |
| 5,459,330 | 10/1995 | Venaille et al. | 250/559.48 |
| 5,734,467 | 3/1998 | Lucas | 250/223 B |

*Primary Examiner*—Stephone Allen
*Attorney, Agent, or Firm*—Kris T. Fredrick

[57] ABSTRACT

A photoelectric sensing unit, especially useful for determining the passage of clear bottles or other low contrast targets on a conveyor, contains two sensors and a signal processing unit to determine the signal differential. The signal differential is compared to a selected value and sensor output is enabled or disabled. High noise immunity, resistance to target reflection, and output reliability result. The unit may correct the selected value to account for environmental change and/or unit component performance. The unit can also figure the speed of passage of the bottles.

14 Claims, 4 Drawing Sheets

DIFFERENTIAL CLEAR CONTAINER SENSOR WITH IMPROVED NOISE IMMUNITY

BACKGROUND OF THE INVENTION

1. Field of the Invention

This invention relates generally to photoelectric sensors and more particularly to a photoelectric sensor with improved noise immunity for use with clear targets passing the sensor on a conveyor line.

2. Description of the Prior Art

The presence of industrial noise degrades the accuracy of sensing applications. In order to make reliable sensing decisions, a photoelectric sensor needs to distinguish the desired signal from unwanted noise signals. The noise signals could be environmental ambient light, reflection from a target surface feature, optical contamination by water spray and dust, EM interference, power supply and light intensity fluctuations and the like.

SUMMARY OF THE INVENTION

Known photoelectric sensors apply light intensity detection. Detection is based on the fact that when an object blocks or intercepts the light beam, the return, or sensed signal level is weaker than compared with that when no object blocks the beam. The sensor typically emits a light pulse train, receives the return light from a reflector and makes an output decision according to the signal level. Known systems evaluate the absolute signal level and compare to see if it is greater or less than predetermined thresholds. These systems assume there is a spatial gap between two adjacent objects, as there usually is between eg., the neck portions of two adjacent bottles.

Referring to FIGS. 1A and 1B, two thresholds, high 12 and low 14, are set, depending on the return light signal level at the gap. The differential between the two thresholds is termed the hysteresis ie. the lag between on and off. When the return signal 16 drops below the lower threshold 14, the sensor identifies an object as moving into the sensing zone and turns its output on. The output stays on until the signal climbs above the higher threshold 12, indicating the object is moving out of the sensing zone, and the sensor turns its output off. This sensing method has been successfully used in high-contrast sensing applications because the signal difference between an object-present condition and an object-absent condition is large (FIG. 1(A)).

However, this is not as reliable a method when applied in low-contrast sensing applications, eg. when clear bottles are the targets, or sensed objects. As seen in FIG. 1(B), for a low-contrast object such as a clear container, there is only a small difference in received light levels between the presence and absence of the object. It is difficult to set the correct sensing thresholds with a high-level hysteresis in a small signal range and make the sensor immune to external noises. For example, in order to reduce the noise effects caused by light attenuation, such as water spray or moisture on the optical parts, it is better to define the range of the thresholds 12 and 14 at a lower level. However, surface reflection light from bottle features and other industrial noises may overshoot the threshold and cause the sensor to shut off, indicating no object presence. On the other hand, if the sensing threshold range is set at a higher level, sensed light may not exceed the upper threshold 12 and the sensor may lock up in the target indication mode, because of reduced light output, dirt, etc.. Therefore the sensor always indicates targets even when no targets are in the sensing zone. The absolute intensity detection in low-contrast sensing applications is sensitive to many environmental disruptions.

Signal average technology, repeatedly changing thresholds or gain ranges may partially reduce noise interference. However, they will not solve the low-contrast sensing problems, and nevertheless, make the sensing devices less robust and their design more complicated.

It is therefore desirable to develop an photoelectric sensor which overcomes the above problems and reliably detects low contrast targets moving through the sensor field on a conveyor.

BRIEF DESCRIPTION OF THE DRAWINGS

The present invention will be more fully and completely understood from a reading of the Description of the Preferred Embodiment in conjunction with the drawings, in which:

FIG. 1A represents an intensity signal from a high-contrast object and FIG. 1B represents an intensity signal from a low-contrast object.

DESCRIPTION OF THE PREFERRED EMBODIMENT

Figure 1:
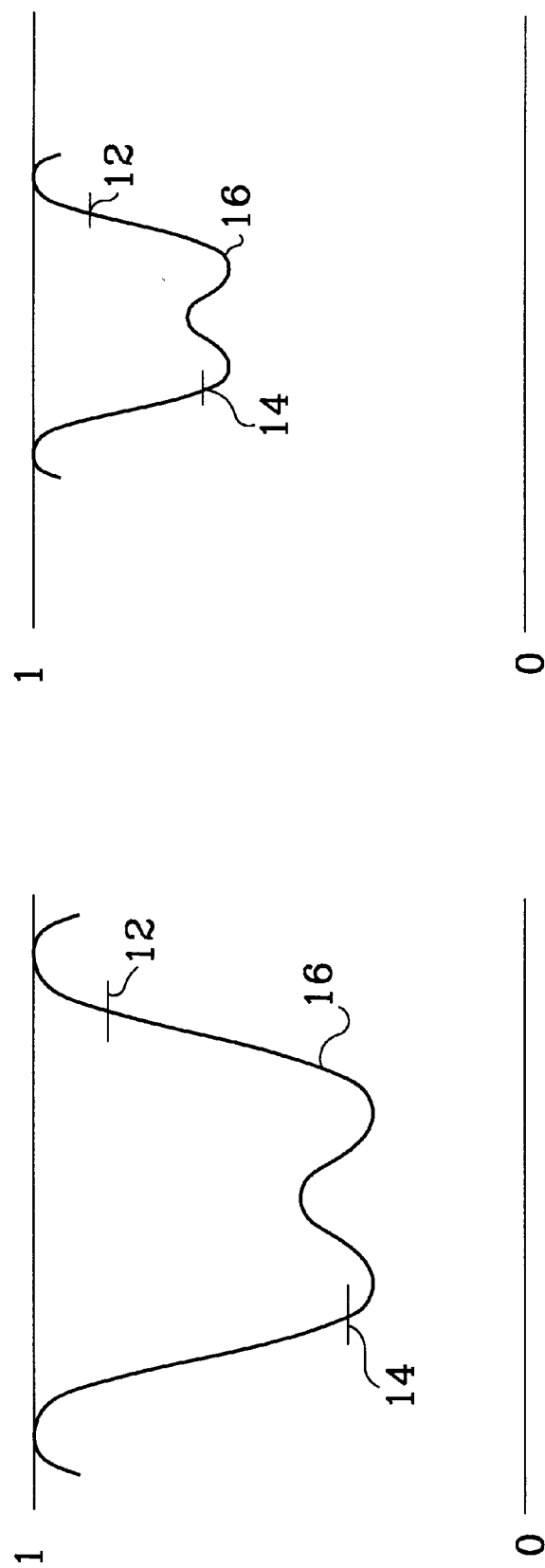
FIG. 1A and 1B represent a scheme of absolute intensity detection. The background intensity has been normalized.

Throughout the Description of the Preferred Embodiment, like components will be identified by like reference numerals.

We have learned that when a clear bottle passes through the sensor, due to excessive light reflectivity and absorption effects at the leading edge and trailing edge of the target the return signal from a retroreflector has two minimum signal values and shows a bell-pepper shape as in FIGS. 1A and 1B. Based on this observation, we have designed a sensor with two detectors (FIG. 2) and developed a differential intensity sensing algorithm.

Figure 2:
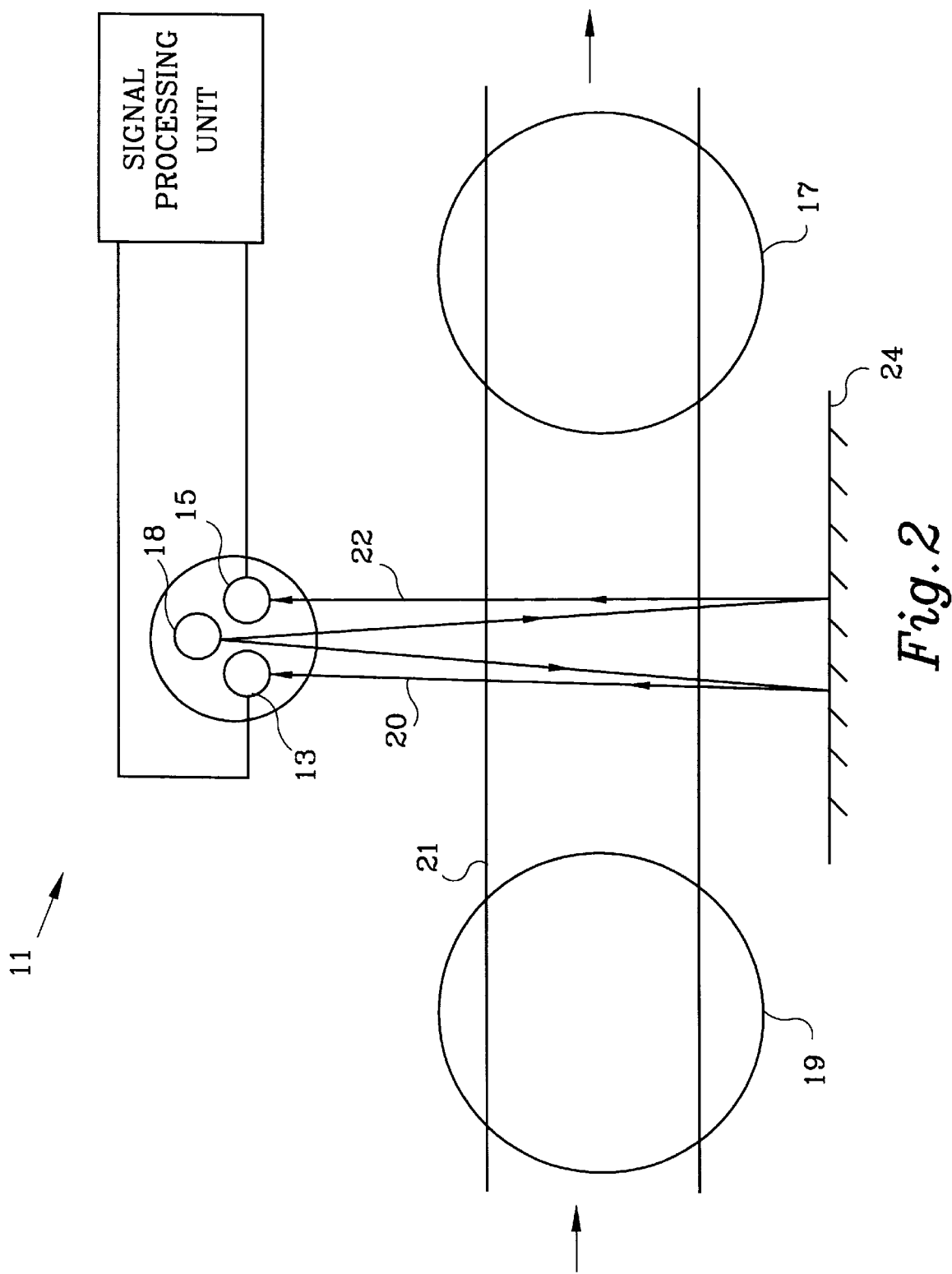
FIG. 2 illustrates the present invention with objects on either side of the sensing zone.

The sensing algorithm of the differential intensity sensor is explained with reference to its various signal outputs and accompanying apparatus as follows. Referencing FIGS. 2–5, instead of monitoring the absolute values in one detector, the sensor 11 of the present invention monitors the differential of the return signals 20 and 22, as sent from a light source such as arc 18 across the conveyor 21 and returned from a retroreflector 24, between first and second individual detectors 13 and 15 respectively. The differential detection algorithm assumes there is a spatial gap between first and second adjacent bottles, 17 and 19, respectively, on the conveyor 21 and the gap is equal or larger than the distance, or center to center spacing, between the detectors 13 and 15. As seen in FIG. 2, when no bottle blocks the light, ie. the gap position, the signal differential between the detectors is approximately zero. Therefore the sensor 11 gives no output.

Figure 3:
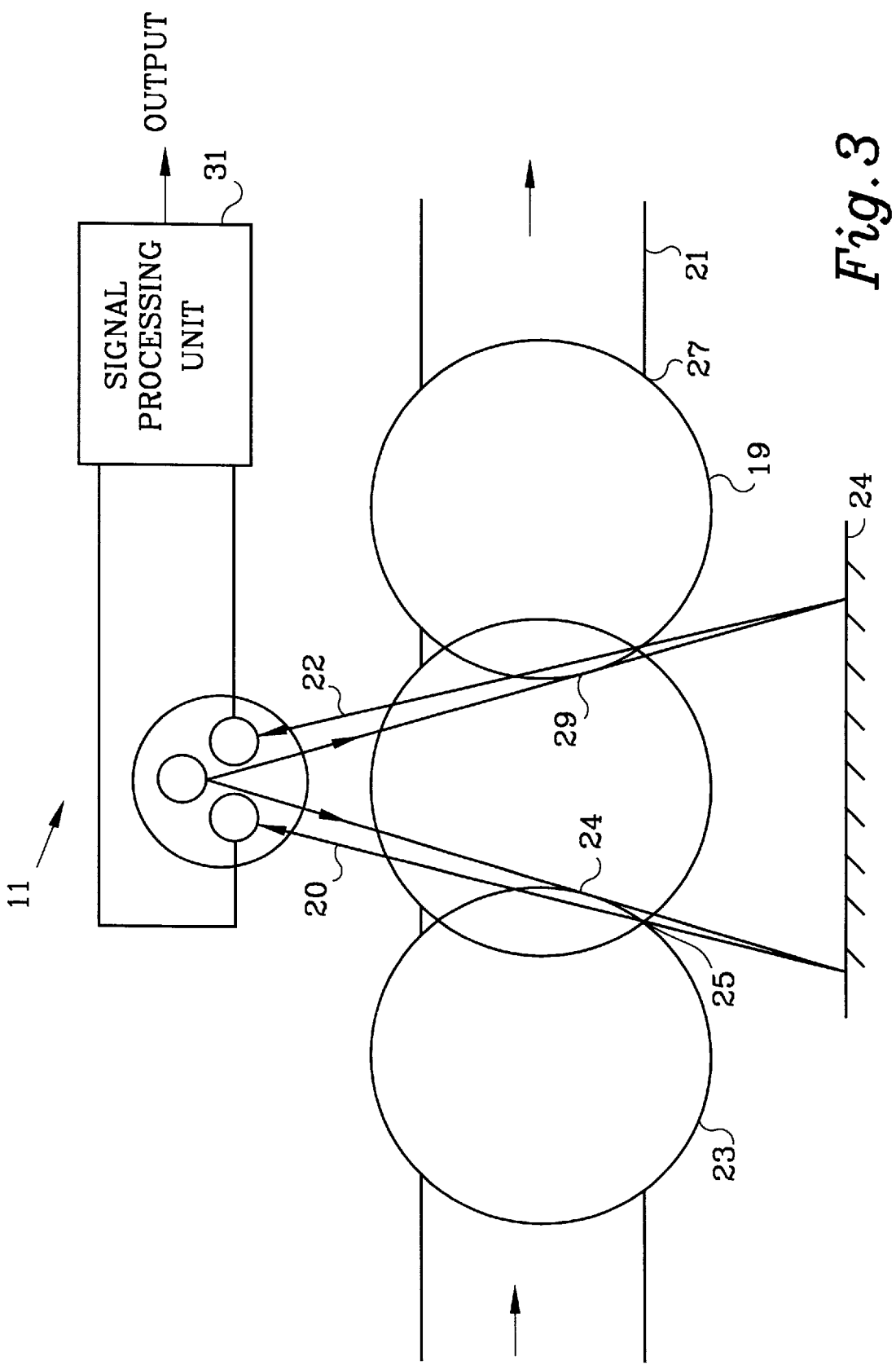
FIG. 3 illustrates a single object moving through the sensing zone.
Figure 4:
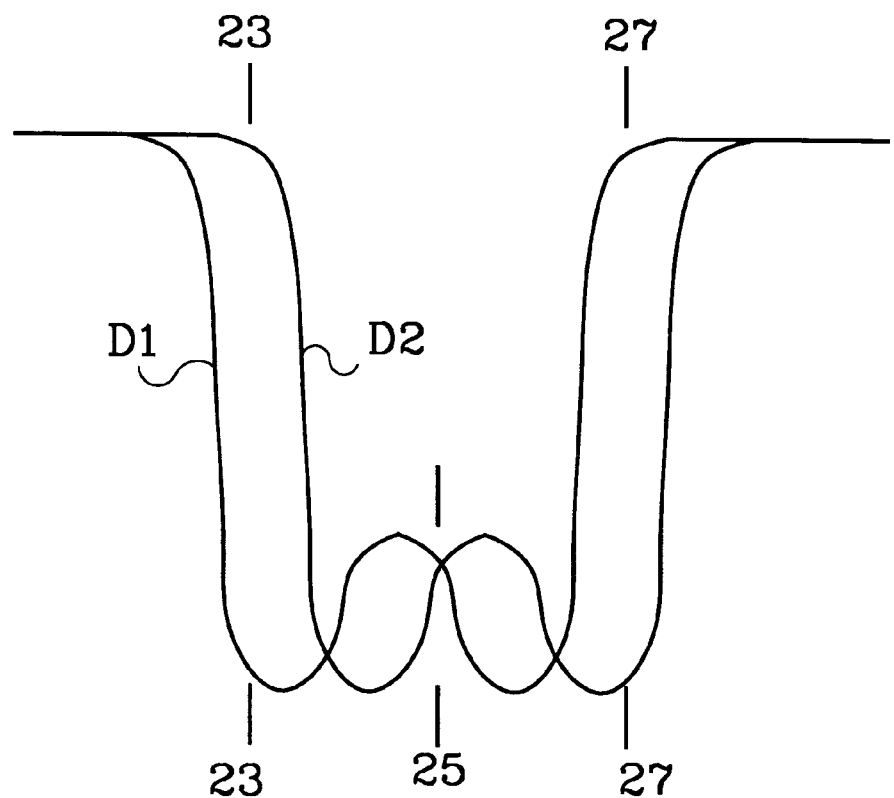
FIG. 4 shows detected light intensity signals from the first and second detectors.
Figure 5:
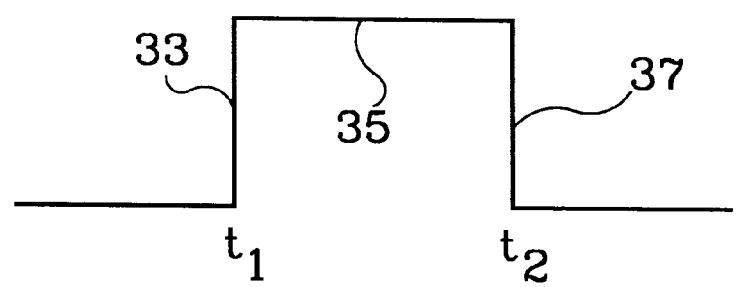
FIG. 5 shows the output of the sensor.

As seen in FIG. 3, when a clear bottle moves into the sensing zone, as seen at position 23, its leading edge 24 blocks the first detector 13 but not the second detector 15. The signal differential reaches the first maximum, $(D_2-D_1)$ >C, where C is a defined constant. The signal processing unit 31 then generates the leading edge 33 of the sensing indication pulse shown in FIG. 5. The bottle, as seen at position 25, then blocks both detectors, 13 and 15. The signal differential drops to a lower value $(D_2-D_1)<<C$, ie. $D_2-D_1$ is much less than C. The sensor 11 does not change its output 35 (FIG. 5). Finally, as seen at position 27, the trailing edge 29 of the bottle blocks the second detector 15, but not the first detector 13. The signal differential again reaches the maximum $(D_1-D_2)>C$. The sensor 11 then generates the trailing edge 37 of the sensing indication pulse and completes a bottle detection (FIG. 5).

The constant, C, can be determined by passing a bottle through the light beam during set up procedure. Using averaging techniques for the high and low values, C can further be adapted to environmental changes and output component degradation. The signal differentials and comparisons can each be operated by the signal processing unit 31. Basically its function is similar to an exclusive OR gate. For example, when the signals are the same you have no state change, when either signal changes you will have a state change.

There are four primary advantages of the sensing method of the present invention. First, the decision making in the sensor is based on the signal differentials, not the absolute values. Any environmental noises affecting both detectors are excluded from the sensing determination. This makes the sensor immune to ambient light, moisture/condensation, dust, light aging and fluctuation, and possible EM noises. Second, the sensor focuses its attention on the two transition positions, the leading edge and the trailing edge of the target, and essentially neglects what happens in between, such as surface reflections from bottle features. This reduces the feature reflection reading problem. Third, the signal follows the pattern: $(D_2-D_1)>C$; $(D_2-D_1)<<C$; $(D_1-D_2)>C$. The signal differential reaches maximum at the two transition positions. This makes the sensor indication more reliable. Fourth, by recording the timings, $t_1$ and $t_2$ (FIG. 5) at the two transition positions, one can obtain the speed of the bottle ($V_b$) on the conveyer by calculating $V_b=a[(|+L)/(t_2-t_1)]$, where | is the distance between $D_1$ and $D_2$, and L is the bottle physical width, with a being connection coefficient added, ie. not set at unity, if necessary for more precise results.

The embodiments of the invention in which an exclusive property or right is claimed are defined as follows:

1. An optical sensor system for detecting the passage of target objects on a conveyor comprising:
    (a) first and second light detectors spaced apart in the direction of conveyor movement for detecting light that has traveled across the conveyor and for emitting signals indicative of the amount of light detected;
    (b) at least one light source for passing detectable light across said conveyor, said light source and said detectors being located on a first side of said conveyor;
    (c) a reflector located on an opposite side of the conveyor from said light source for returning the light to said detectors; and
    (d) a processing unit for receiving and comparing said signals and determining their difference to thereby determine the passage of the target object.

2. The optical sensor system according to claim 1 wherein:
    the processing unit further evaluates the speed of object passage according to the formula $V_b=a[(1+L)/(t_2-t_1)]$, where 1=distance between the detectors, L=width of target, $t_1$=sensor time on, $t_2$=sensor time off, and a=a correction coefficeint.

3. The optical sensor system according to claim 1 wherein:
    the determination is done according to the algorithm $(D_2-D_1)>C$; $(D_2-D_1)<<C$; $(D_1-D_2)>C$=object passage; where $D_2$=signal level of second sensor $D_1$=signal level of first sensor and C=a selected value.

4. The optical sensor system according to claim 3 wherein:
    the condition: $(D_2-D_1)>C$ turns the sensor output on; and $(D_1-D_2)>C$ turns the sensor output off.

5. The optical sensor system according to claim 3 wherein:
    the processing unit further evaluates the averages of the difference comparisons and adjusts C accordingly.

6. An optical sensor system for detecting the passage of light transmissive objects on a conveyor comprising:
    a light emitter positionable on a first side of said conveyor for emitting light substantially perpendicular to direction of said conveyor travel;
    a reflector positionable on a second side of said conveyor for returning light towards emitter;
    the emitter and reflector spaced at a distance to let the objects pass therebetween;
    a first sensor and a second sensor placed on the first conveyor side, the first sensor being upstream respective to conveyor travel, for detecting light returned from said reflector and outputting a signal based on the amount of light received therefrom;
    a signal processing unit for accepting signals from the first and second sensors, comparing the signal difference and determining the passage of a target object based upon said difference.

7. The optical sensor system according to claim 6, wherein:
    the signal processing unit determines object speed by the formula $V_b=a[1+L)/(t_2-t_1)]$, where 1=space between detectors, L=width of target, $t_1$=sensor time on, $t_2$=sensor time off, and a=a correction coefficient.

8. The optical sensor system according to claim 6, wherein:
    the determination is done according to the algorithm $(D_2-D_1)>C$; $(D_2-D_1)<<C$; $(D_1-D_2)>C$=object passage where $D_2$=signal level of second sensor $D_1$=signal level of first sensor and C=a selected value.

9. The optical sensor system according to claim 8 wherein:
    the condition: $(D_2-D_1)>C$ turns the sensor output on; $(D_2-D_1)<<C$ is the sensor hysteresis; and $(D_1-D_2)>C$ turns the sensor output off.

10. The optical sensor system according to claim 8, wherein:
    the signal processing unit averages the difference comparison values and adjusts C to account for environmental changes affecting the sensor system.

11. A method of detecting the passage of a light transmissive object on a conveyor comprising:
    emitting light across the direction of movement of the conveyor;
    moving the object through the emitted light; simultaneously detecting the emitted light at first and second locations spaced along the direction of movement of the conveyor and determining the amount of light received at said first and second locations;
    comparing the difference in said amount of light received at said first and second locations to a constant value; and outputting a signal indicative of said object passage based on said comparing.

12. The method of detecting the passage of a light transmissive object on a conveyor according to claim 11, further comprising:

evaluating the speed of object passage according to the formula $V_b = a[(1+L)/(t_2-t_1)]$, where 1=distance between detectors, L=width of target, $t_1$=sensor time on, and $t_2$=sensor time off.

13. The method of detecting the passage of a light transmissive object on a conveyor according to claim 11, further comprising:

operating the sensor according to the algorithm $(D_2-D_1)>C$; $(D_2-D_1)<<C$; $(D_1-D_2)>C$=object passage where $D_2$=signal level detection at the second location; $D_1$=signal level detection at a first location; and C=a selected value in the range of detector values, wherein:

the condition: $(D_2-D_1)>C$ turns a sensor output on; and $(D_1-D_2)>C$ turns a sensor output off.

14. The method of detecting the passage of a light transmissive object on a conveyor according to claim 13, further comprising:

evaluating the speed of object passage according to the formula $V_b = a[(1+L)/(t_2-t_1)]$, where 1=distance between detectors, L=width of target, $t_1$=sensor time on, and $t_2$=sensor time off.

* * * * *